United States Patent
Kariya

(10) Patent No.: US 6,169,897 B1
(45) Date of Patent: Jan. 2, 2001

(54) MOBILE COMMUNICATIONS SYSTEM AND MOBILE TERMINAL THEREFOR WITH CAPABILITIES TO ACCESS LOCAL INFORMATION RESOURCES

(75) Inventor: Kazuo Kariya, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/053,302

(22) Filed: Apr. 1, 1998

(30) Foreign Application Priority Data

Sep. 22, 1997 (JP) .................................................... 9-256560

(51) Int. Cl.$^7$ ............................. G03G 1/09; H04M 11/00
(52) U.S. Cl. ............................. 455/426; 455/66; 340/905
(58) Field of Search ............................. 340/905; 455/426, 455/208, 211, 223, 224; 701/208, 211; 709/223, 224

(56) References Cited

U.S. PATENT DOCUMENTS

| | | | |
|---|---|---|---|
| 5,732,074 | * 3/1998 | Spaur et al. | 370/313 |
| 5,848,396 | * 12/1998 | Gerace | 705/10 |
| 5,870,546 | * 2/1999 | Kirsch | 709/205 |
| 5,999,973 | * 12/1999 | Glitho et al. | 709/223 |
| 6,014,090 | * 1/2000 | Rosen et al. | 340/905 |

FOREIGN PATENT DOCUMENTS 8336182  12/1996  (JP) .

* cited by examiner

*Primary Examiner*—Daniel S. Hunter
*Assistant Examiner*—Alan T. Gantt
(74) *Attorney, Agent, or Firm*—Helfgott & Karas, P.C.

(57) ABSTRACT

A mobile communications system which provides a mobile subscriber with local information related to the area where his/her mobile terminal is located. A link list page is compiled in a URL list server by collecting the URLs of various home pages containing local information, and a local representative URL is assigned to the compiled link list page. A URL retrieving unit receives an area identification signal from a radio base station, and retrieves the local representative URL associated with the received area identification signal. A representative URL transmission unit then transmits the local representative URL retrieved by the URL retrieving unit to the URL list server, thus making access to the link list page stored therein. A list transmission unit, disposed in the URL list server, retrieves the link list page that corresponds to the local representative URL received from the representative URL transmission unit, and it returns the retrieved local URL list to the mobile terminal. The local URL list received from the list transmission unit is displayed on a monitor screen of the mobile terminal, allowing the subscriber to select an appropriate URL to reach the desired local information resource.

14 Claims, 6 Drawing Sheets

FIG. 3 (A) CZ/AREA INDEX CONVERSION TABLE

FIG. 3 (B) CITY-CLASS LOCAL URL REGISTRATION TABLE

FIG. 3 (C) DISTRICT-CLASS LOCAL URL REGISTRATION TABLE

MOBILE COMMUNICATIONS SYSTEM AND MOBILE TERMINAL THEREFOR WITH CAPABILITIES TO ACCESS LOCAL INFORMATION RESOURCES

BACKGROUND OF THE INVENTION

1. Field of the Invention

The present invention generally relates to mobile communications systems and mobile terminals used therefor, and more particularly, to a mobile communications system in which a mobile terminal can easily obtain local information that is peculiar to a specific area where the mobile terminal is located, by using some functions available in the Internet infrastructure. The present invention also relates to a mobile terminal used in such a mobile communications system.

2. Description of the Related Art

The Internet World Wide Web (WWW) is widely used in recent years, allowing people to make access to various on-line information stored in a number of WWW servers by using web browser software. WWW servers provide hypertext documents which can link itself to other data on the same server, as well as to some particular pages on other servers. When combined with today's mobile communication technologies, the Internet environment will make it possible for mobile subscribers in the field to make access to any desired data on WWW sites. Actually, some researchers have studied such an on-the-road usage of the hypertext infrastructure for retrieval of information specific to an area where the subscribers are located.

There have been such information services that provide local residents with some information that is peculiar to a specific geographical region where they live, including bargain sales, events and meetings, parking lot availability, local map information, etc. Most of the existing local information services are designed to deliver such information via a public carrier telecommunications network. People get phone numbers usually from newspapers, magazines, and other advertisement media, and call an appropriate site when they need some information.

While there are a number of different information resources in the country, people will certainly give high priority and importance to local information sources in a specific region where they live or work, as well as in its surrounding regions. In their daily lives, local residents naturally receive information about what local resources are available and how they can reach those resources. Therefore, it is relatively easy for residents to make access to their local information resources. As opposed to this, it is not easy for visitors to reach such resources because they have no background knowledge about the local information sources available there.

Today's widespread proliferation of mobile technologies has allowed people to travel with portable telecommunications equipment including radiotelephones and mobile computer terminals. Mobile subscribers may wish to access local information resources about the exact place where they are visiting, as well as about its surrounding area. However, the conventional information services are not convenient to such mobile subscribers, since it is difficult for them to know which phone number to dial for making access to the desired resource.

To solve this problem, researchers have proposed several ways to provide and use local information services in mobile communications environments. For example, the Japanese Patent Laid-open Publication No. 6-19929 (1994) discloses a car park reservation system for mobile environments. Further, the Japanese Patent Laid-open Publication No. 8-336182 (1996) discloses a local information service system. Those two patents, however, require a complex, large-scale system configuration. Particularly, the local information service system proposed in the latter patent demands a complicated and large processing mechanism to be implemented in its network portion.

SUMMARY OF THE INVENTION

Taking the above into consideration, an object of the present invention is to provide a mobile communications system with a simple configuration which allows subscribers to make access to local information resources in mobile environments. To provide a mobile terminal used in such a mobile communications system is another object of the present invention.

To accomplish the first object, according to the present invention, there is provided a mobile communications system which includes a plurality of radio base stations regularly transmitting area identification signals that uniquely identify individual radio service coverage areas thereof, a mobile terminal located in either one of the radio service coverage areas of the plurality of radio base stations, and a mobile communications switching system that interconnects the plurality of radio base stations and a public telecommunications network.

This mobile communications system comprises:

(a) a URL list server, being connected to the mobile communications switching system, which stores a plurality of local URL lists addressed with different local representative URLs;

(b) a storage unit, disposed in the mobile terminal, which stores the local representative URLs associated with the plurality of area identification signals;

(c) a URL retrieving unit, disposed in the mobile terminal, which receives the area identification signal from one of the plurality of radio base stations, and out of said storage means, retrieves one of the local representative URLs that is associated with the received area identification signal;

(d) a representative URL transmission unit, disposed in the mobile terminal, which transmits the one of the local representative URLs retrieved by the URL retrieving unit to the URL list server;

(e) a list transmission unit, disposed in the URL list server, which retrieves one of the plurality of local URL lists that corresponds to the local representative URL received from the representative URL transmission unit, and transmits the retrieved local URL list to the mobile terminal; and (f) a display unit, disposed in the mobile terminal, which displays the local URL list received from the list transmission unit.

To accomplish the second object mentioned above, according to the present invention, there is provided a mobile terminal for use in a mobile communications system including a plurality of radio base stations regularly transmitting area identification signals that uniquely identify individual radio service coverage areas thereof, a mobile communications switching system that interconnects the plurality of radio base stations and a public telecommunications network, and a URL list server connected to the mobile communications switching system for storing a plurality of local URL lists addressed with different local representative URLs.

This mobile terminal is located in either one of the radio service coverage areas of the plurality of radio base stations, and comprises:

(a) a storage unit which stores the local representative URLs associated with the plurality of area identification signals;

(b) a URL retrieving unit which receives the area identification signal from one of the plurality of radio base stations, and out of said storage means, retrieves one of the local representative URLs that is associated with the received area identification signal;

(c) a representative URL transmission unit which transmits the one of the local representative URLs retrieved by the URL retrieving unit to the URL list server;

(d) a list transmission unit, disposed in the URL list server, which retrieves one of the plurality of local URL lists that corresponds to the local representative URL received from the representative URL transmission unit, and transmits the retrieved local URL list to the mobile terminal; and (e) a display unit which displays the local URL list that is received from the list transmission unit in response to the local representative URL that has been sent by the representative URL transmission unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
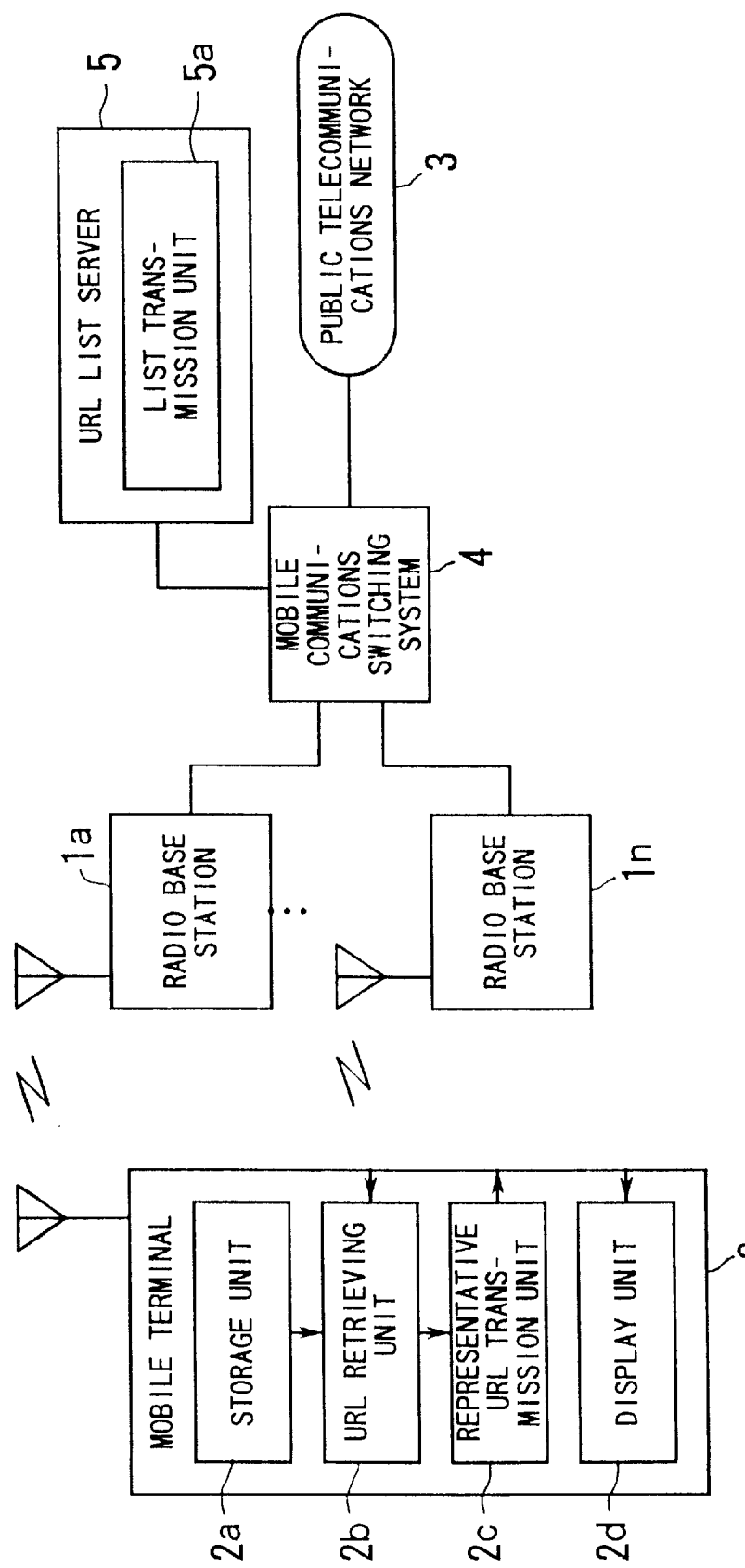
FIG. 1 is a conceptual view of the present invention.

Referring first to FIG. 1, the following section will describe the concept of a first embodiment of the present invention. FIG. 1 shows a mobile communications system of the first embodiment, which includes a plurality of radio base stations 1a to 1n which regularly transmit unique area identification signals indicating their respective radio service coverage areas. There is a mobile terminal 2 located in either one of those radio service coverage areas. The plurality of radio base stations 1a to 1n are interconnected by a mobile communications switching system 4, which provides a link to a public telecommunications network 3.

As distinctive features of the first embodiment, the mobile communications system comprises the following structural elements:

(a) a URL list server 5, connected to the mobile communications switching system 4, which stores a plurality of local URL lists each addressed with different local representative URLs;

(b) a storage unit 2a, disposed in the mobile terminal 2, which stores the local representative URLs associated with the plurality of area identification signals;

(c) a URL retrieving unit 2b, disposed in the mobile terminal 2, which receives the area identification signal from one of the plurality of radio base stations 1a to 1n, and out of the storage unit 2a retrieves one of the local representative URLs that is associated with the received area identification signal;

(d) a representative URL transmission unit 2c, disposed in the mobile terminal 2, which transmits the one of the local representative URLs retrieved by the URL retrieving unit 2b to the URL list server 5;

(e) a list transmission unit 5a, disposed in the URL list server 5, which retrieves one of the plurality of local URL lists that corresponds to the local representative URL received from the representative URL transmission unit 2c, and transmits the retrieved local URL list to the mobile terminal 2; and (f) a display unit 2d, disposed in the mobile terminal 2, for displaying the local URL list received from the list transmission unit 5a.

In the above-described structural arrangement, the URL list server 5 provides a local URL list for each local representative URL. More specifically, the URL list server 5 collects the Uniform Resource Locators (URLs) of home pages where various topics related to some specific regions (e.g., Yokohama and Kawasaki, etc.) is available, and creates a new web page containing a table that lists the collected URLs. This table is referred to as a "local URL list," while the web page created as such is called "link list page." Further, the address of this link list page is registered as a "local representative URL." The URL list server 5 stores such link list pages for many different regions, and when a specific local representative URL is received from a subscriber, it retrieves and delivers a relevant link list page to him/her.

The storage unit 2a stores some data tables prescribed about all possible area identification signals that the mobile terminal 2 may receive from the radio base stations 1a to 1n, in combination with the local representative URLs corresponding to the area identification signals.

In the above environment, the URL retrieving unit 2b in the mobile terminal 2 first receives an area identification signal sent from the radio base station 1a, and retrieves a local representative URL corresponding to the received area identification signal out of the storage unit 2a. Subsequently, the representative URL transmission unit 2c makes access to a relevant link list page by transmitting the local representative URL retrieved by the URL retrieving unit 2b to the URL list server 5.

The list transmission unit 5a disposed in the URL list server 5 retrieves a local URL list corresponding to the local representative URL sent from the representative URL transmission unit 2c, and transmits it to the mobile terminal 2. The mobile terminal 2 receives this information from the list transmission unit 5a, and the display unit 2d presents the local URL list to the subscriber.

Now that the local URL list is displayed on the display unit 2d, the subscriber, the owner of the mobile terminal 2, can choose a home page which is expected to have the desired local information, thereby obtaining the target URL.

The first embodiment of the present invention provides a simple way to realize an information service system that allows mobile subscribers to make access to the desired local information resources.

Figure 2:
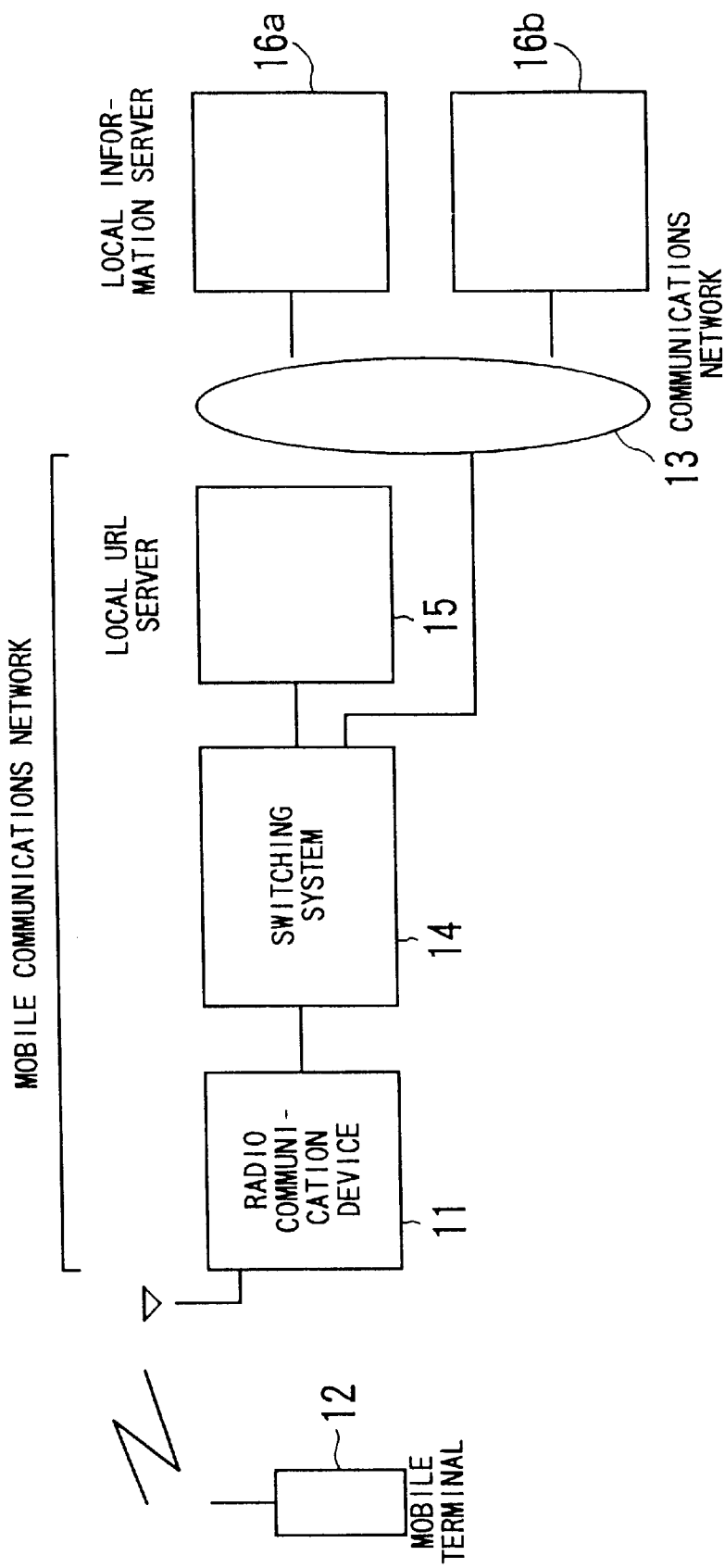
FIG. 2 is a total block diagram of a first embodiment of the present invention.

Now, the first embodiment of the present invention will be described in detail below. FIG. 2 is a total block diagram of the first embodiment, in which a radio communication device 11 serves as one of the radio base stations 1a to 1n shown in FIG. 1. Similarly, a mobile terminal 12 in FIG. 2 corresponds to the mobile terminal 2 in FIG. 1, a communications network 13 to the public telecommunications network 3, a switching system 14 to the mobile communications switching system 4, and a local URL server 15 to the URL list server 5.

The radio communication device 11 transmits radio waves to its own radio service coverage area, as well as receiving waves from mobile terminals within the area. It also assigns traffic channels for such radio communications and performs a call connection control at the side of mobile subscribers. The radio communication device 11 regularly transmits notification data to its own coverage area, which data includes a Control Zone (CZ) signal to uniquely identify the service coverage area of the radio communication device 11. The mobile terminal 12 is a piece of mobile communications equipment with an Internet web browser. It is assumed here that the mobile terminal 12 has been located within the radio service coverage area of the radio communication device 11 or has just entered thereto from an outside area. The mobile terminal 12 extracts the CZ signal out of the notification data sent from the radio communication device 11, and reads out a local representative URL corresponding to the extracted CZ signal by looking up some tables explained below.

Figure 3:
FIG. 3(A) is a diagram which shows a CZ-area index conversion table stored in each mobile terminal.
FIG. 3(B) is a diagram which shows a city-class local URL registration table stored in each mobile terminal.
FIG. 3(C) is a diagram which shows a district-class local URL registration table stored in each mobile terminal.

FIGS. 3(A) to 3(C) illustrate some tables held in the mobile terminal 12. First, FIG. 3(A) shows a CZ/area index conversion table. Before starting to use the present system, the subscriber is requested to specify the class of areas which he/she expects to be covered by a local information server. For example, the subscriber may roughly select city-class areas or choose smaller district-class areas. The CZ/area index conversion table of FIG. 3(A) is created so as to cover any combinations of these classes and the CZ signals. Now, the mobile terminal 12 allows the subscriber to choose either city-class areas or district-class areas. Inside the mobile terminal 12, his/her choice is represented by a simple flag. For instance, a flag value of "0" represents city-class areas, while a flag value of "1" means district-class areas. When this flag is set to "0," the CZ/area index conversion table of FIG. 3(A) gives city-class area index values of idxH1, idxH2, etc., for different CZ signal values CZa, CZb, etc. Likewise, when the flag is set to "1," the table gives district-class area index values of idxL1, idxL2, etc., for the different CZ signal values CZa, CZb, etc., respectively.

FIG. 3(B) shows a city-class local URL registration table, which includes entries for various area indices idxH1, idxH2, etc. and their respective local representative URLs. The data item named "Yokohama city URL," for instance, holds a URL of the link list page for Yokohama city, which page provides a collection of URLs, or links, that lead the subscribers to various home pages where local information related to the city of Yokohama is available.

Similarly, FIG. 3(C) shows a district-class local URL registration table, which includes entries for various area indices idxL1, idxL2, etc., and their respective local representative URLs. The data item named "West district URL," for instance, contains a URL of the link list page prepared for the West district of Yokohama city. This link list page presents a collection of URLs that lead the subscribers to various home pages where local information related to the West district of Yokohama is available.

Referring back to FIG. 2, the communications network 13 is a wide-area network such as the Internet, which interconnects the mobile communications network and local information servers 16a and 16b as will be described later. The switching system 14 is a switching station that performs call connection control, service control, and other line control functions for the mobile communications network. The local URL server 15 supplies a list of URLs for each local representative URL. More specifically, the local URL server 15 collects URLs of various home pages containing some area-specific information, and forms them into a web page to provide the mobile subscribers with a link list, called a "local URL list." The local URL server 15 stores a plurality of such link list pages for individual areas. The aforementioned local representative URLs are used to locate those link list pages.

Figure 4:
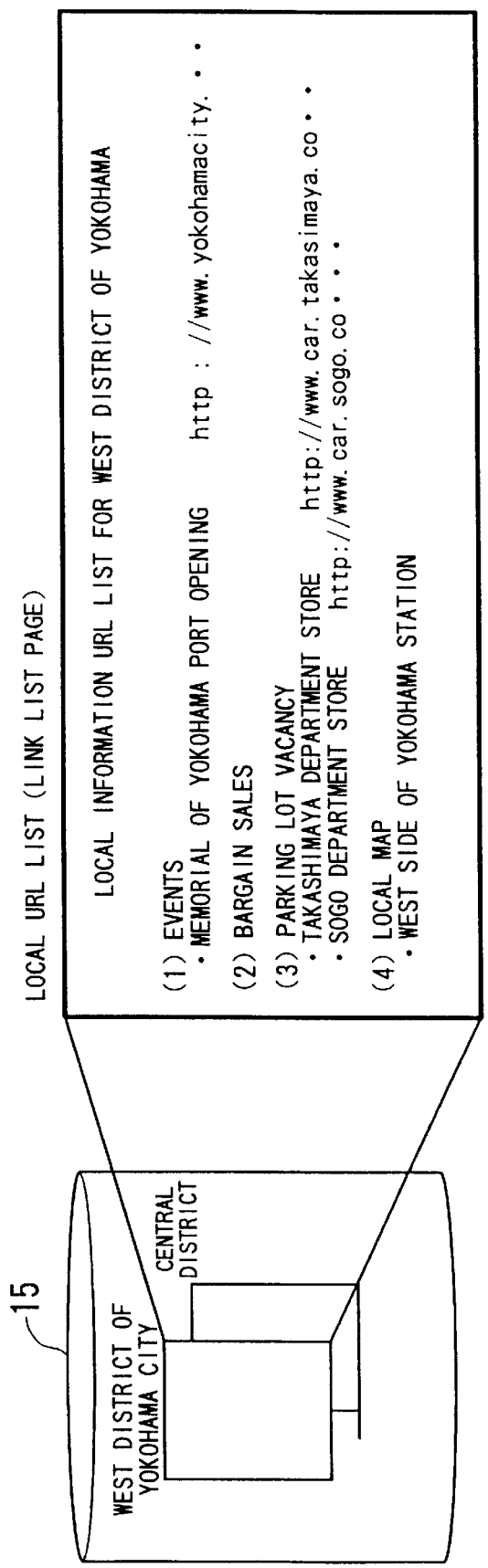
FIG. 4 is a diagram which shows an example of a link list page stored in a local URL server.

FIG. 4 shows an example of the link list pages stored in the local URL server 15. One page provides a URL list of home pages containing local information about "West district" of Yokohama city.

Referring back to FIG. 2, local information servers 16a and 16b provide WWW home pages where different kinds of local information are available. They are designed to output relevant hypertext data to the requesting mobile terminals in response to a specific URL transmitted therefrom.

Figure 5:
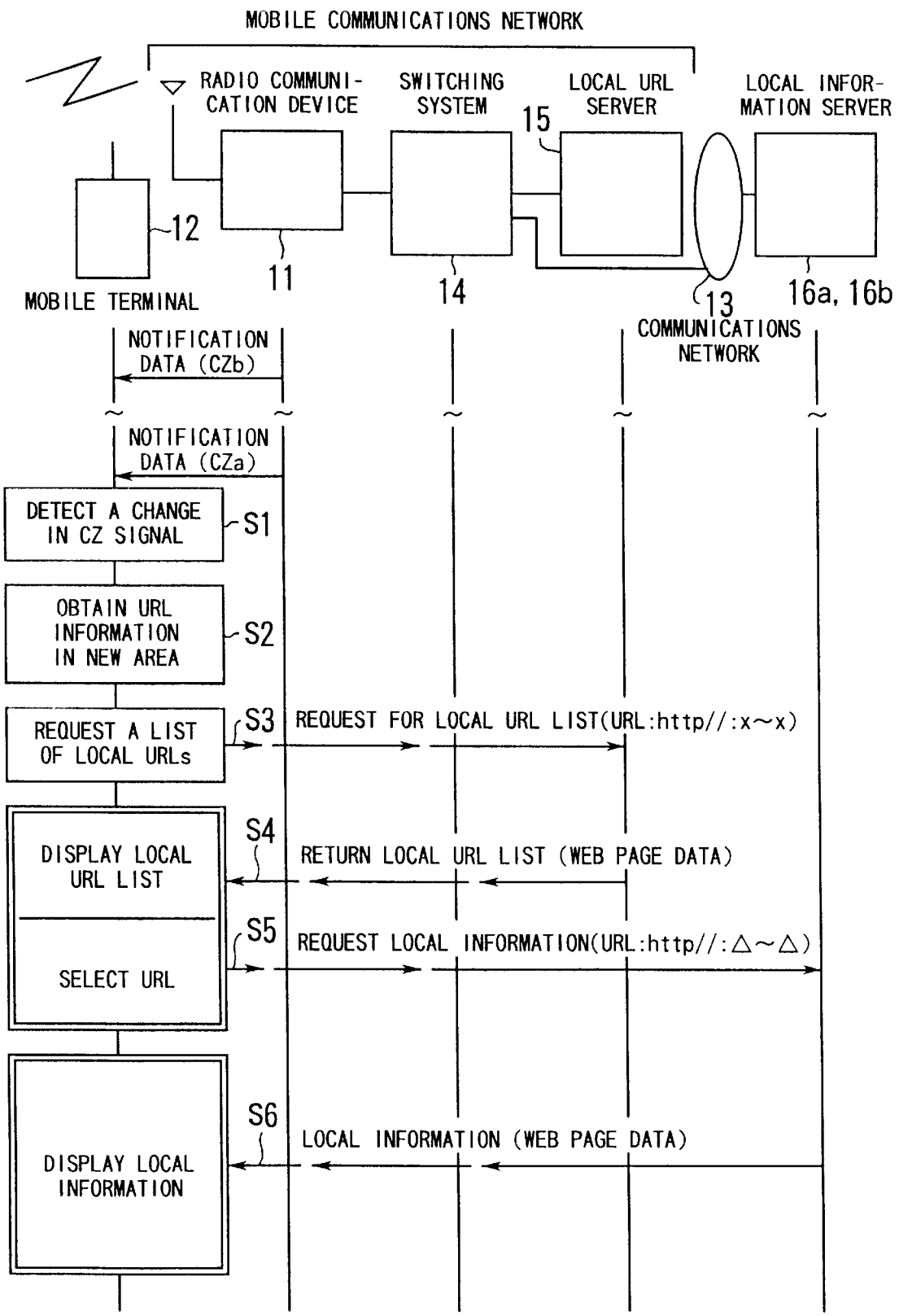
FIG. 5 is a sequence diagram which shows a method of obtaining local information in the first embodiment.

Referring next to FIG. 5, the next paragraphs will describe how the mobile subscribers can obtain the desired local information in the first embodiment. FIG. 5 is a sequence diagram which shows a method of obtaining local information in the first embodiment. The following explanation proceeds in the sequence of step numbers shown in FIG. 5.

(S1) The mobile terminal 12 receives notification data that is regularly sent from radio communication devices, and extracts a CZ signal out of the received notification data. By monitoring the CZ signal, the mobile terminal 12 knows that it has moved from one radio service coverage area to another area. Suppose here that the mobile terminal 12 has moved from an area with a CZ signal of "CZb" to another area with a CZ signal of (S2) The mobile terminal 12 obtains a relevant local representative URL. It is assumed, for instance, that the subscriber has previously commanded the mobile terminal 12 to search for local information concerning district-class areas; i.e., the flag is set to "1." In this case, the mobile terminal 12 refers to the CZ/area index conversion table of FIG. 3(A) so as to retrieve an area index value of "idxL1" corresponding to the flag value "1" and the CZ signal value "CZa." Next, the mobile terminal 12 obtains a local representative URL "West district URL" that corresponds to the retrieved area index value "idxL1" by consulting the district-class local URL registration table of FIG. 3(C).

(S3) The mobile terminal 12 makes access to the local URL server 15 by using the local representative URL obtained in step S2.

(S4) The local URL server 15 retrieves a link list page corresponding to the local representative URL, and sends it back to the mobile terminal 12. The mobile terminal 12 displays the received link list page on its monitor screen. In the present example, the link list page addressed by the local representative URL "West district URL" is displayed on the monitor screen as illustrated in FIG. 4.

While the system executes the above steps S1 to S4 automatically, without interacting with the subscriber, the mobile terminal 12 can also be configured to stop the execution of steps S2 to S4 optionally.

(S5) The subscriber browses the link list page displayed on the mobile terminal 12's monitor screen to find a home page URL which is expected to have the desired local information. By clicking one of the URLs of his/her choice, the subscriber commands the mobile terminal 12 to make access to either local information server 16a or 16b so as to visit the home page of interest.

(S6) Either of the local information servers 16a and 16b responds to the access from the mobile terminal 12 by extracting data of the home page specified by the URL and sending the extracted home page data to the mobile terminal 12. The mobile terminal 12 displays the received page on its monitor. In this way, the mobile subscriber easily reaches the desired local information related to the area where he/she is.

While the above-described mobile terminal 12 automatically identifies the present location, it can also be configured to accept a subscriber's command to specify the desired target area, not necessarily limited by the present geographical location. In this optional configuration, the mobile terminal will supply the local URL server 15 with a local representative URL corresponding to the area specified by the subscriber.

Further, in step S2, the mobile terminal 12 automatically executes a process of retrieving a relevant local representative URL and making access to an appropriate link list page, upon detection of its entry to a new radio service coverage area. In addition to this automated method, the mobile terminal can be configured to initiate the same process by a manual instruction of the subscriber.

Now, a second embodiment of the present invention will be described below, with reference to FIG. 6. Since the second embodiment has basically the same structure as that of the first embodiment, the next section will not repeat the same explanation for those like elements, but focus on some distinctive points of the second embodiment.

Figure 6:
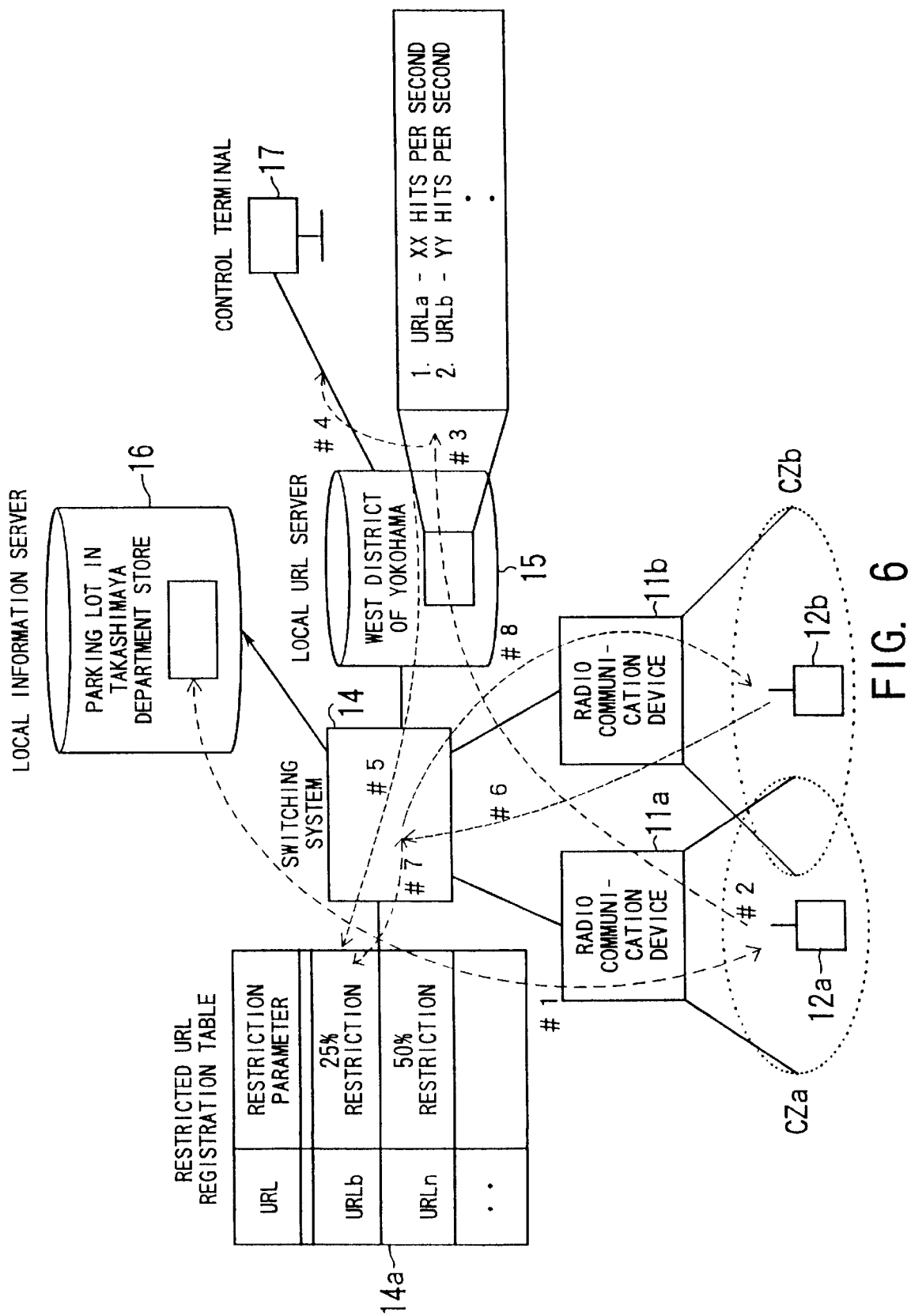
FIG. 6 is a diagram which shows the configuration and operation of a second embodiment of the present invention.

In FIG. 6, the second embodiment assumes that radio communication devices 11a and 11b are connected to a switching system 14, and mobile terminals 12a and 12b are located in different radio service coverage areas. The radio communication devices 11a and 11b have the same structure as that of the radio communication device 11 explained earlier in the first embodiment, while the mobile terminals 12a and 12b are the same as the mobile terminal 12 of the first embodiment. The radio communication devices 11a and 11b output different CZ signals CZa and CZb, respectively. The system includes a local information server 16 that corresponds to one of the local information servers 16a and 16b in the first embodiment. The communications network 13 in the first embodiment is not shown in FIG. 6.

The second embodiment differs from the first embodiment in that each link list page stored in the local URL server 15 has a field titled "hits per hour" for each individual URL entry. This "hits per hour" field shows the number of accesses (i.e., hit count) per one hour made from mobile terminals to the link list page of interest. Furthermore, the local URL server 15 is equipped with a client terminal 17, and the switching system 14 has a restricted URL registration table 14a. This restricted URL registration table 14a contains some restriction control parameters that are defined for each URL of local information resources.

The next paragraphs explain the operation of the second embodiment. In comparison with the first embodiment, the second embodiment has implemented some additional functions to prevent a particular web page from concentrated accesses. Referring to FIG. 6, the following will explain the new functions, in the order of sequence numbers #1 to #8.

The mobile terminal 12a receives a web page data containing local information from the local information server 16 as described in step S6 of FIG. 5 (#1). The mobile terminal 12a updates the link list page that has been received the local URL server 15 by incrementing its "hits per hour" field relevant to the web page that has just been received from the local information server 16. The updated link list page is sent back to the local URL server 15 (#2). Then the local URL server 15 overwrites the original link list page with the updated page (#3). The local URL server 15 monitors every "hits per hour" field contained in the link list page, checking whether the field value indicates excessive accesses or not. If any field value has exceeded a predetermined threshold, the local URL server 15 sends a warning message to the control terminal 17 (#4). Upon receipt of this warning message, the operator of the control terminal 17 requests the relevant webmaster to take a countermeasure (e.g., addition of mirror servers) to relieve the workload currently disposed on the server due to the concentration of accesses.

At the same time, the local URL server 15 registers a new entry to the restricted URL registration table 14a in the switching system 14, which defines a restriction control parameter concerning access to the URL in question. The value of this restriction control parameter is determined in accordance with the actual hit count observed in the local URL server 15 (#5). Suppose, for instance, that a new entry for URLb with a restriction control parameter of 25% has been registered to the restricted URL registration table 14a.

In the above situation, it is further assumed that the other mobile terminal 12b has made access to the web page in question by using the address URLb (#6). The switching system 14 then reads out a relevant restriction control parameter (i.e., 25%) by referring to the restricted URL registration table 14a (#7), executes an access restriction process according to this parameter, and notifies the mobile terminal 12b of the restriction (#8). While the mobile terminal 12b uses the network in part to interact with the switching system 14, this mechanism avoids the increase in communication traffic in the rest of the network.

The above discussion is summarized as follows. According to the present invention, the mobile terminal can automatically acquire a local representative URL that is appropriate for its present location. This feature provides a simple way to realize an information service system that allows the mobile subscribers to make access to the desired area-specific information.

The present invention also protects a particular web page from excessively frequent accesses by restricting or decimating the calls to that page. This assures comfortable network access, as well as preventing communication traffic from being adversely affected.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile communications system which includes a plurality of radio base stations regularly transmitting area identification signals that uniquely identify individual radio service coverage areas thereof, a mobile terminal located in either one of the radio service coverage areas of the plurality of radio base stations, and a mobile communications switching system that interconnects the plurality of radio base stations and a public telecommunications network, the mobile communications system comprising:

a URL (Uniform Resource Locator) list server, being connected to the mobile communications switching system, for storing a plurality of local URL lists addressed with different local representative URLs;

storage means, disposed in the mobile terminal, for storing the local representative URLs associated with the plurality of area identification signals;

URL retrieving means, disposed in the mobile terminal, for receiving the area identification signal from one of the plurality of radio base stations, and out of said storage means, retrieving one of the local representative URLs that is associated with the received area identification signal;

representative URL transmission means, disposed in the mobile terminal, for transmitting the one of the local representative URLs retrieved by said URL retrieving means to said URL list server;

list transmission means, disposed in the URL list server, for retrieving one of the plurality of local URL lists that corresponds to the local representative URL received from said representative URL transmission means, and transmitting the retrieved local URL list to the mobile terminal; and display means, disposed in the mobile terminal, for displaying the local URL list received from said list transmission means.

2. The mobile communications system according to claim 1, wherein each local URL list is a collection of URLs of a plurality of web pages containing local information related to a prescribed area that is at least a part of the radio service coverage area of one of the radio base stations.

3. The mobile communications system according to claim 2, wherein the local representative URLs are URLs of web pages that contain the local URL lists corresponding to the prescribed areas.

4. The mobile communications system according to claim 1, wherein said storage means stores a plurality of local representative URLs for each of the area identification signals;

said URL retrieving means has a predetermined flag to specify a size of an area, and according to the predetermined flag, selects one of the plurality of local representative URLs corresponding to the received area identification signal.

5. The mobile communications system according to claim 1, wherein said URL retrieving means periodically monitors the area identification signals being transmitted by the plurality of radio base stations, and if the present area identification signal is different from the area identification signal that has been previously received, said URL retrieving means retrieves one of the local representative URLs associated with the present area identification signal from said storage means.

6. The mobile communications system according to claim 1, further comprising stopping means for forcibly stopping operations of said URL retrieving means and said representative URL transmission means.

7. The mobile communications system according to claim 1, further comprising access means disposed in the mobile terminal for making access to a web page containing local information by using a URL selected by an operator from among those in the local URL list displayed by said display means, wherein said URL list server provides the local URL lists each of which is composed of URLs of a plurality of web pages each containing local information related to a prescribed area that is at least a part of the radio service coverage area of one of the radio base stations, each of the local URL lists provided by said URL list server has hit count fields for the respective URLs contained therein, and when said access means has made access to the web page by using the URL selected by the operator, the hit count field relevant to the selected URL is updated with an increased hit count value.

8. The mobile communications system according to claim 7, further comprising monitoring & warning means, disposed in said URL list server, for monitoring hit count values in the hit count fields, and when any hit count value exceeding a predetermined threshold is found, generating a warning message to a webmaster who maintains a web page exhibiting the excessive hit count value.

9. The mobile communications system according to claim 7, further comprising:

restriction parameter storage means, disposed in the mobile communications switching system, for storing an access restriction parameter for each URL included in the local URL lists provided by said URL list server; and restriction parameter determining means, disposed in said URL list server, for monitoring hit count values recorded in the hit count fields, and when any hit count value exceeding a predetermined threshold is found, determining the access restriction parameter corresponding to the URL of a web page exhibiting the excessive hit count value.

10. The mobile communications system according to claim 9, further comprising access restriction means, disposed in the mobile communications switching system and activated when said access means has made access to a web page with a specific URL, for retrieving one of the access restriction parameters that corresponds to the specific URL, and restricting further accesses to the web page according to the retrieved access restriction parameter.

11. A mobile terminal for use in a mobile communications system including a plurality of radio base stations regularly transmitting area identification signals that uniquely identify individual radio service coverage areas thereof, a mobile communications switching system that interconnects the plurality of radio base stations and a public telecommunications network, and a URL list server connected to the mobile communications switching system for storing a plurality of local URL lists addressed with different local representative URLs, the mobile terminal being located in either one of the radio service coverage areas of the plurality of radio base stations, the mobile terminal comprising:

storage means for storing the local representative URLs associated with the plurality of area identification signals;

URL retrieving means for receiving the area identification signal from one of the plurality of radio base stations, and out of said storage means, retrieving one of the local representative URLs that is associated with the received area identification signal;

representative URL transmission means for transmitting the one of the local representative URLs retrieved by said URL retrieving means to said URL list server; and display means for displaying one of the local URL lists that is received from said URL list server in response to the local representative URL that has been sent by said representative URL transmission means.

12. A mobile terminal for use in a mobile communications system including a plurality of radio base stations transmitting area identification signals that uniquely identify individual radio service coverage areas thereof, and a URL list server for storing a plurality of URL lists addressed with different URLs, the mobile terminal comprising:

storage means for storing the URLs associated with the plurality of area identification signals;

URL retrieving means for receiving the area identification signal from one of the plurality of radio base stations, and retrieving one of the URLs that is associated with the received area identification signal;

URL transmission means for transmitting the URL retrieved by said URL retrieving means to said URL list server; and display means for displaying the URL list that is received from said list server in response to the URL that has been sent by said URL transmission means.

13. The mobile terminal according to claim 12, wherein the URLs stored in said storage means are local representative URLs, and the URL list is a local URL list.

14. A mobile terminal comprising:

a storage unit which stores a plurality of URLs;

a URL retrieving unit which retrieves one of the URLs based on an area identification signal received from a radio base station;

a transmission unit which transmits the retrieved URL to a server storing a plurality of URL lists addressed with different URLs; and a display unit which displays one of the URL lists that is provided by the server as being relevant to the retrieved URL.

* * * * *